No. 766,300. PATENTED AUG. 2, 1904.
G. H. WARD.
FEED WATER FILTER.
APPLICATION FILED APR. 18, 1903.
NO MODEL. 3 SHEETS—SHEET 3.
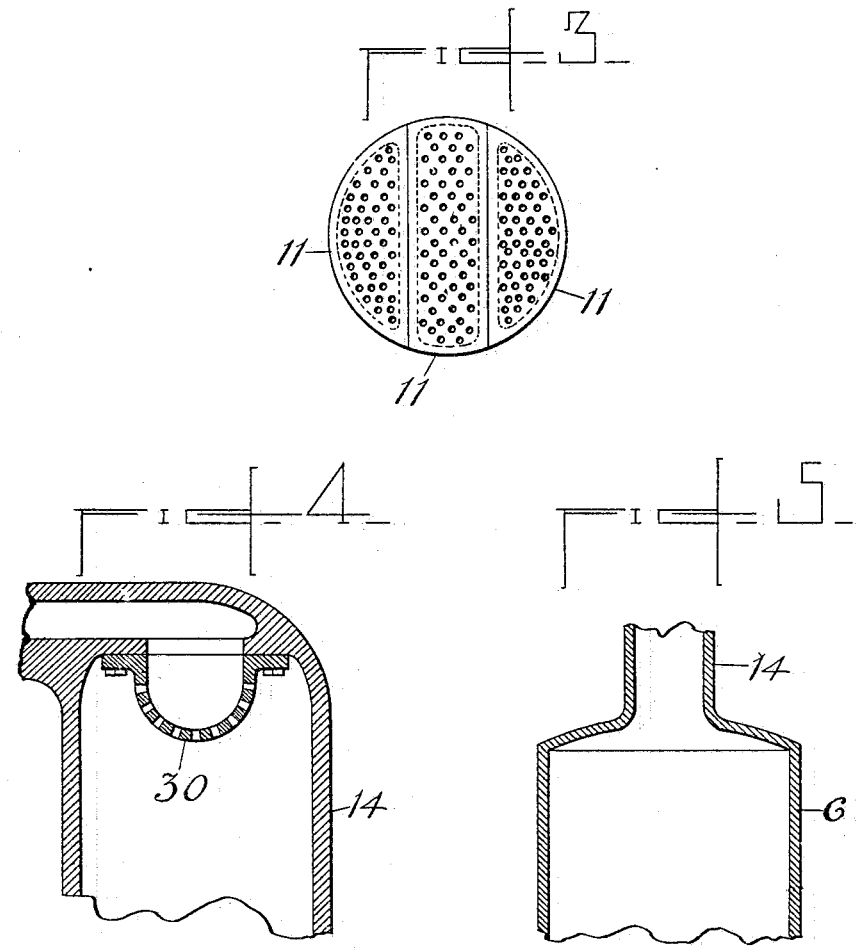

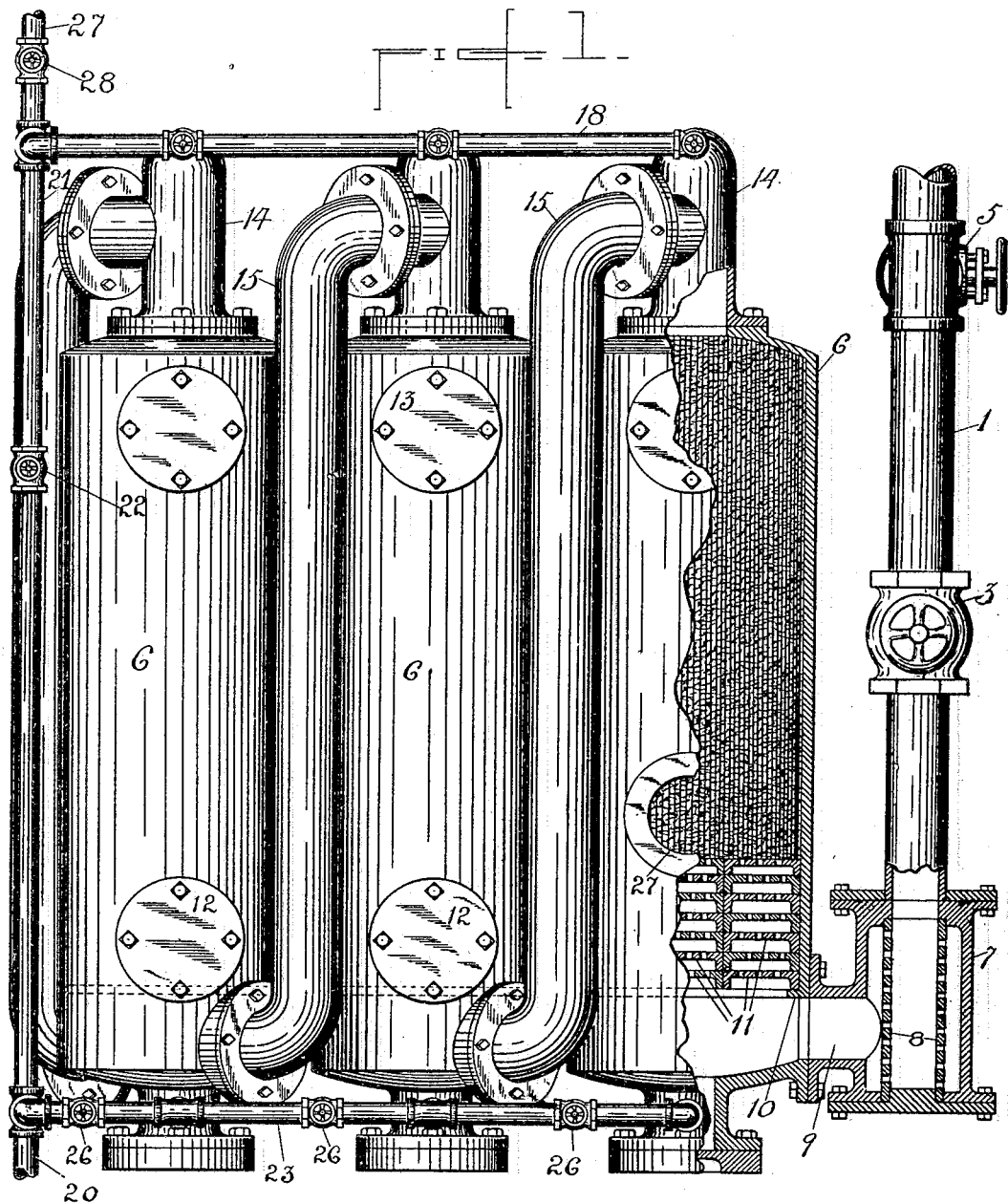

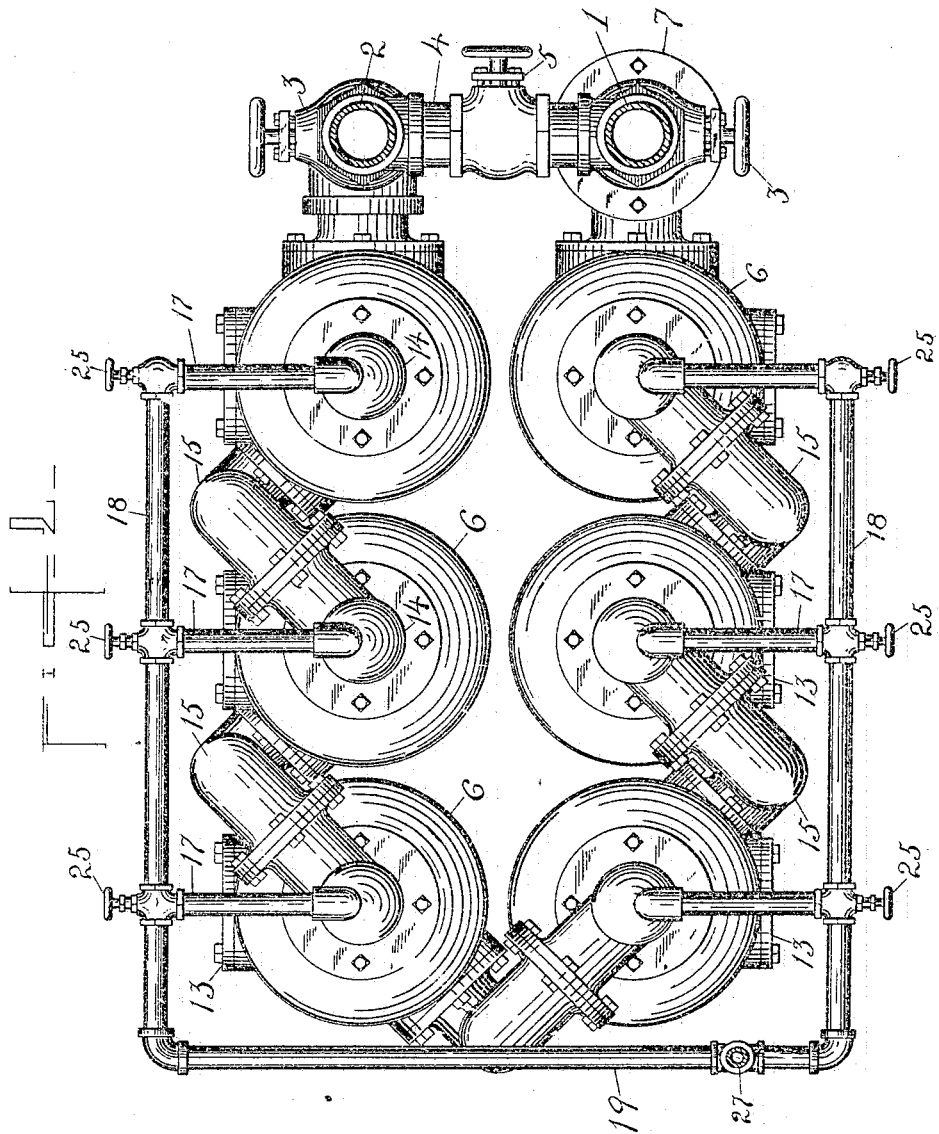

No. 766,300. Patented August 2, 1904.

UNITED STATES PATENT OFFICE.

GEORGE H. WARD, OF BROOKLYN, NEW YORK.

FEED-WATER FILTER.

SPECIFICATION forming part of Letters Patent No. 766,300, dated August 2 1904.

Application filed April 18, 1903. Serial No. 153,212. (No model.)

*To all whom it may concern:*

Be it known that I, GEORGE H. WARD, a citizen of the United States, and a resident of Brooklyn, in the county of Kings, and State of New York, have invented certain new and useful Improvements in Feed-Water Filters, of which the following is a specification.

My invention relates to filters designed to remove impurities from water by passing it through a column of charcoal or other filtering material and at the same time to collect and remove any oil or other liquid of less specific gravity than the water that may be commingled therewith.
The apparatus is especially designed as a feed-water filter for removing from the water of condensation of steam-engines any oil with which it has become impregnated and in addition cleansing the water by passing it through the filtering substance.

In my prior patent, No. 592,675, I have shown and described a filter in which a cylinder is provided with a number of partitions, so arranged and provided with ports properly located that the water is circulated through a number of filtering-columns, first upwardly and then downwardly through the succeeding column, the oil being accumulated at the top of each column wherein the upward circulation takes place and being removed therefrom through proper surface blows or valves connected with a waste-pipe.

My present invention relates mainly to improvements in the construction of a filter differing from my previously-patented filter in that the filter is so organized as to attain an upward circulation in all or practically all of the series of chambers of filtering-columns, while at the same time provision is made for permitting the oil accumulated to be readily removed.

The invention consists also in improved arrangements of pipe and valves to provide for cleansing of the columns by steam and the conduction of the accumulated oil to the waste-pipe or other duct leading to a suitable receptacle.

My present invention also relates to means whereby the zinc plates described in my prior patent as the means for removing oxygen from the feed-water may be readily inserted and replaced in the filter-cylinder, and, further, to an improved construction whereby the filter may be conveniently recharged with filtering material as occasion may require.

My invention consists in the details of construction and the combination of parts, as will be hereinafter more fully set forth and then specified in the claims.

In the accompanying drawings, Figure 1 represents in side elevation a series of cylinders combined and organized according to my invention. Fig. 2 is a plan of the same, and Fig. 3 shows in plan the section of zinc plate. Fig. 4 is a vertical central section through the top portion of one of the tanks or the oil-trap to show the manner in which the baffle-plate may be interposed to prevent the disintegrating action of the steam upon the filtering medium, and Fig. 5 shows a modification wherein the cylinder-body and the trap portion are made in one piece.

I show my invention as carried out in connection with a series of six cylindrical filter-tanks arranged side by side in immediate proximity and in two rows of three each, the circulation being through one row of three in one direction and back through the other row to the outlet-pipe, so as to bring the inlet and outlet pipes near to one another and permit ready application of a suitable by-pass, which is used during cleaning and blowing off, as described in my prior patent already referred to.

1 is the inlet-pipe through which the water is introduced into the system of filter-cylinders, and 2 is the outlet-pipe through which it is removed properly cleansed. Said pipes are provided each with the usual valve, (indicated at 3,) and they are connected by a cross-pipe 4, controlled by a valve 5, to form a by-pass, which, however, during normal operation of the filter remains closed, as well understood in the art.

6 indicates the cylinders, which contain a filtering medium, such as charcoal or other desired material, supported on suitable trays, so as to support the column above the inlet for the liquid, which is in the case of each cylinder circulated upward through the mass of material. In the passage from the inlet-pipe 1 to the first cylinder of the series is provided a suitable strainer-box 7, in which is fitted the brass pipe 8, filled with a number of holes whose combined area should be approximately three times the area of the connection 9, through which the water is passed into the bottom of the first tank of the series.

In the first tank and supported upon a suitable annular ledge 10 within the same are the superposed zinc plates 11, used for the purpose described in my prior patent. These plates are introduced and removed from said cylinder through an opening 27, closed by any suitable cover or door, and to permit the ready insertion and removal of the plates each is made up in transverse sections, as shown in Fig. 3. Above the series of zinc plates supported on the ledge is imposed the filtering medium, such as charcoal, and a similar column of filtering medium is provided in each one of the series of tanks, said column being supported on a suitable tray in each instance, whose location is indicated by the transverse dotted lines near the bottom of the cylinder, where there is provided a proper support carried on a ledge similar to the ledge 10. At the bottom of each remaining tank of the series there is provided a suitable cleaning-out port or opening closed by the plate or cover 12.

At the top of each tank is provided a charging door or opening for introducing the filtering material, each port or opening being closed by the plate or cover 13, secured by proper tap-bolts or other means.

At the top of each cylinder is provided a cylinder or section of reduced size, 14, which is provided with a proper flange, as shown, to permit it to be bolted down over an opening in the top of the cylinder, and which part of the device I herein term the "trap," since at the closed or blind end thereof the oil accumulating at the top of each circulating column of water is trapped or inclosed.

15 indicates circulating-pipes through which the liquid is circulated from the top of one cylinder to the bottom of the next, so as to give in the series of cylinders a series of circulating columns of liquid, in each of which the flow is in upward direction. These circulating-pipes may be connected in any suitable manner by proper pipe-couplings, which, preferably, in the case of the upper end of the pipe is a coupling attached to or made a part of the trap 14.

Extending from the traps 14 and above the level of the outlet through which the liquid flows to the circulating-pipe 15 are the branch oil or surface blowpipes 17, terminating, as shown, in header-pipes 18, joined to a pipe 19, which communicates with a waste-pipe 20, Fig. 1, through the stand-pipe 21, which is provided with a suitable stop-valve 22. Bottom blow connections for the several tanks are taken off by similar branch pipes to headers, such as indicated at 23, Fig. 1, which headers connect in a similar way with the waste-pipe 20. Valves 25 are placed in the top headers to control the surface blow connection with the stand-pipe 21, and similar valves 26 are placed in the bottom blow connection with the waste-pipe 20. Suitable live-steam connection is provided for the top header and surface blow connections by a pipe 27, Fig. 1, and steam-valves 28 in the connection leading to the cross-pipe 19, joining the headers 18.

In the operation of this apparatus the by-pass valve stands normally closed, and the several valves 25, 26, 22, and 28 are also closed. When it is desired to remove the oil accumulated in the traps at the top of the filter-columns, the valves 25 are opened, so as to connect the oil and surface blows of the tanks, one or more at a time, with the pipe 19 and the waste-pipe through valve 22, which is at such times opened. The water then circulates through the inlet-pipe 1, through the tanks, and through the traps 14 to the waste-pipe, carrying with it oil accumulated on the surface of the trap-water at the top of the extensions 14 to the waste-pipe.

When it is desired to cleanse the filtering medium by the live steam, the valve 22 is closed and valve 28 is opened to introduce steam to the headers 18. By manipulating the valves 26 in conjunction with the valves 25 steam may be then forced through the columns and the waste carried off through the pipe 20. By proper manipulation of the valves the filtering-columns may be cleaned or purified separately.

When the filtering medium is to be renewed, it can be removed through the doors 12 and fresh material introduced through the doors 13. As will be seen, this renewal of filtering material can be effected without dismantling the apparatus or the system of pipes and connections to permit access to the end of the filter-cylinder, and in this respect my present invention is a great improvement over previous organizations, which ordinarily require more or less dismantling or removal of the parts in order to renew the filtering medium. Removal of the plates can be effected through the door in the side of the first cylinder 6 of the series. During such operations of cleansing by the steam and of cleaning and removal of the contents of the cylinders by the doors in the sides thereof the by-pass valve 5 is opened and the valve 2 to the outlet is closed, the valve 3 in the inlet-pipe also being closed. The water then may circulate directly by the by-pass without entering the filter-cylinders.

While I have shown and described the tank and trap 14 as made in two pieces, it is obvious that, especially for smaller constructions, they might be cast in one piece and as illustrated in Fig. 5. It is also obvious that the zinc plates 11 might be placed in any other one of the series of cylinders or tanks instead of in that one nearest the inlet-pipe. To prevent the disintegrating effect of the steam-jet upon the filtering medium by a blast action of the incoming steam, a suitable baffle-plate or diaphragm may be interposed in the path of the steam-jet above the column of filtering medium, as illustrated in Fig. 4. In this figure, 30 shows in section a perforated plate of curved form suitably fastened in the head of the trap 14 and over the port or opening through which the steam is admitted. This baffle-plate is preferably made of brass or other non-oxidizable material to resist the oxidizable effect of the steam.

What I claim as my invention is—

1. In a feed-water filter, a series of cylindrical tanks communicating with one another by water circulating-pipes joining the top of one tank with the bottom of the next tank of the series, surface blow branch pipes running from a trap at the top of each tank to a header-pipe provided with valves whereby water and oil may be circulated or removed from the tanks, one at a time, a series of bottom blow branch pipes and headers having valves controlling the escape to a waste-pipe, a connection from the header or headers in which the surface blow branches terminate, to the waste-pipe, a cut-off valve controlling the connection to said waste-pipe, and a steam-supply pipe connected to said headers and provided with a suitable cut-off valve as and for the purpose described.

2. In a filter, a cylindrical chamber adapted to hold a filtering medium, a series of cylindrical zinc plates each made in transverse sections and supported within said tank or cylinder near the bottom and an opening in the side thereof for the removal or replacement of said plates.

3. In a feed-water filter, the combination substantially as described of a series of independent filters or cylinders connected by circulating-pipes whereby the circulation in all the series is upward, a surface blow for each cylinder, a live-steam pipe for supplying steam to a header branching to said surface blows, a connection from said header to a stand-pipe through which material delivered through the surface blow may be conducted away, and a valve in said stand-pipe for closing the same when steam is supplied to the header.

4. In a filter, the combination substantially as described of two series of filter-cylinders connected by circulating-pipes and each provided at its top with a suitable trap for the collection of oil, a series of headers in which blow-off pipes or connections leading from said pipes terminate, a stand-pipe joined to said headers, a live-steam pipe also connected to said headers and valves in said stand-pipe and live-steam connection, as and for the purpose described.

Signed at Brooklyn, in the county of Kings and State of New York, this 11th day of April, A. D. 1903.

GEO. H. WARD.

Witnesses:
 FREDK. BOESEN,
 H. E. PETTIT.